(12) United States Patent
Patel et al.

(10) Patent No.: US 11,336,493 B1
(45) Date of Patent: May 17, 2022

(54) DYNAMIC TRANSMISSION IMPAIRMENT CORRECTION FOR SATELLITE SYSTEMS

(71) Applicant: Hughes Network Systems, LLC, Germantown, MD (US)

(72) Inventors: Kumudchandra Patel, Clarksburg, MD (US); Robert Kepley, Gaithersburg, MD (US); Jack Edwin Lundstedt, Jr., Germantown, MD (US); Yogesh Sethi, Boyds, MD (US); Gaurav Bhatia, Elkridge, MD (US); Vinay Gandla, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/139,042

(22) Filed: Dec. 31, 2020

(51) Int. Cl.
*H04L 27/01* (2006.01)
*H04B 7/185* (2006.01)
*H04B 1/04* (2006.01)

(52) U.S. Cl.
CPC ........... *H04L 27/01* (2013.01); *H04B 1/0475* (2013.01); *H04B 7/18515* (2013.01); *H04B 2001/0425* (2013.01)

(58) Field of Classification Search
CPC ... H04L 27/01; H04B 7/18515; H04B 1/0475; H04B 2001/0425
See application file for complete search history.

(56) References Cited

U.S. PATENT DOCUMENTS

| | | | | |
|---|---|---|---|---|
| 9,608,676 | B2* | 3/2017 | Chen | H03F 3/245 |
| 9,813,085 | B1* | 11/2017 | Butler | H04L 5/22 |
| 10,862,517 | B2* | 12/2020 | Kim | H03F 1/3241 |
| 2009/0180573 | A1* | 7/2009 | Thesling | H04L 25/022 375/296 |
| 2020/0366253 | A1* | 11/2020 | Megretski | H03F 1/0227 |

OTHER PUBLICATIONS

Beidas Bassel F et al.; "OFDM-Like Signaling for Broadband Satellite Applications: Analysis and Advanced Compensation"; IEEE Transactions on Communications; Jan. 1, 2017, pp. 1-1, XP055897116, Piscataway, NJ, USA. ISSN: 0090-6778, DOI: 10.1109/TCOMM. 2017.2749376 (14 pages).

Beidas Bassel F; "Radio-Frequency Impairments Compensation in Ultra High-Throughput Satellite Systems", IEEE Transactions on Communications, IEEE Service Center, Piscataway, NJ, USA; vol. 67, No. 9, Sep. 1, 2019; pp. 6025-60038; XP011745675; ISSN: 0090-6778; DOI: 10.1109/tcomm.2019 2926031 (retrieved on Sep. 13, 2019). (11 pages).

International Search Report and Written Opinion dated Mar. 15, 2022 for related application PCT/US2021/061693 (11 pages).

* cited by examiner

*Primary Examiner* — Dac V Ha
(74) *Attorney, Agent, or Firm* — Bejin Bieneman PLC

(57) ABSTRACT

A system includes a processor and a memory. The memory stores instructions executable by the processor to identify an equalization response for equalizing an output signal of a modulator of a satellite gateway, generate a compensation response based on the equalization response and a sample rate of a pre-distorter of the modulator, and send the equalization response to the pre-distorter.

25 Claims, 8 Drawing Sheets

SMA Components 700

DYNAMIC TRANSMISSION IMPAIRMENT CORRECTION FOR SATELLITE SYSTEMS

BACKGROUND

In a satellite gateway, a transmit path may pass through various types of signal processing components, such as switching and combining networks, inter-facility links (IFLs), upconverters and high-power amplifiers. Such components can introduce various impairments upon carrier signals as they traverse the transmit path, such as noise, amplitude/gain variation, amplitude ripple and slope, group delay variation (phase non-linearity), inter-modulation due to amplifier compression/non-linearity, and other impairments. Such impairments can have the effect of increasing modulation error and decreasing signal fidelity, negatively impacting satellite link capacity.

DETAILED DESCRIPTION

Figure 1:
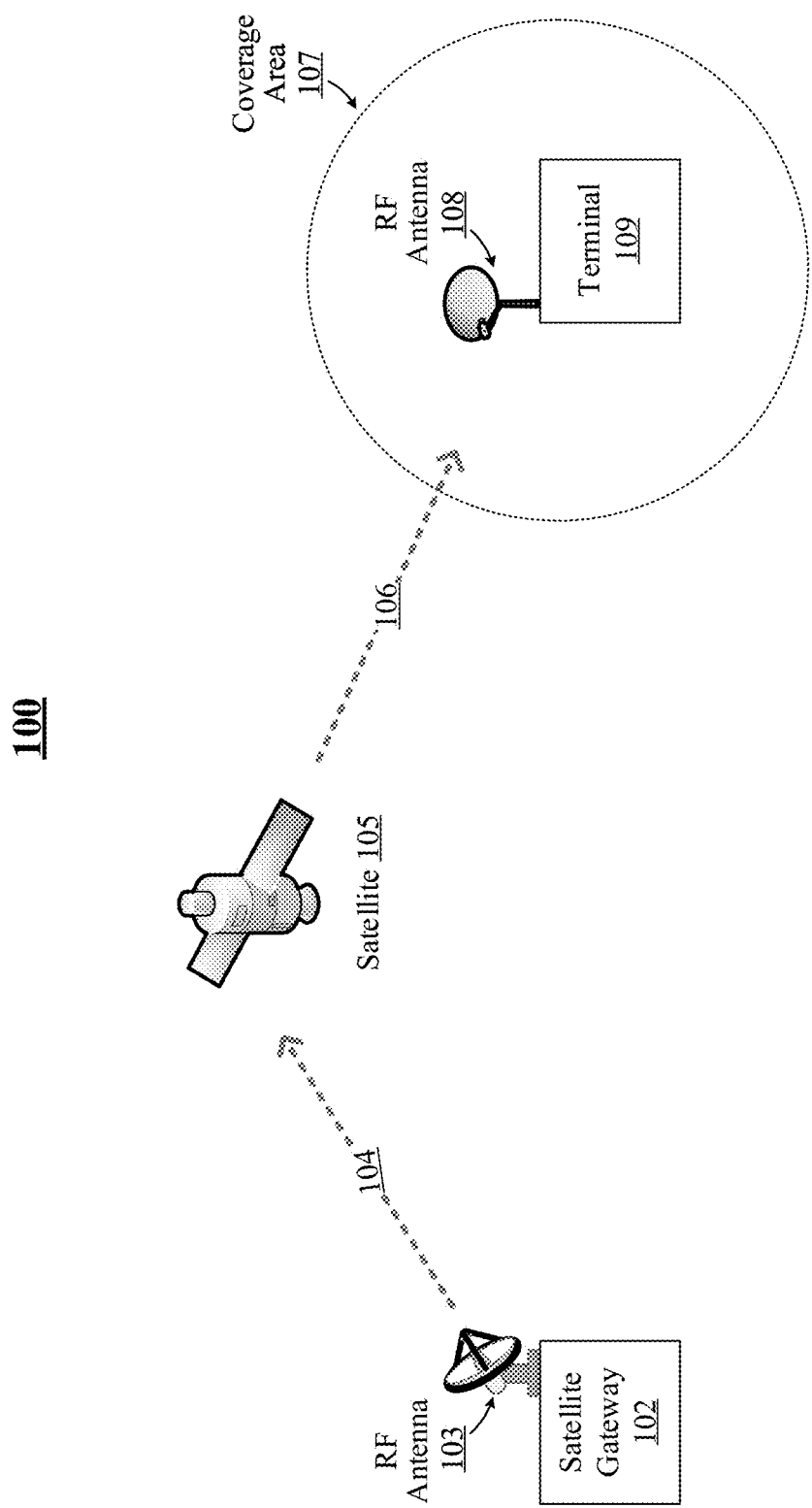
FIG. 1 illustrates an example of a satellite network.

Disclosed herein is a system including a processor and a memory. The memory stores instructions executable by the processor to identify an equalization response for equalizing an output signal of a modulator of a satellite gateway, generate a compensation response based on the equalization response and a sample rate of a pre-distorter of the modulator, and send the equalization response to the pre-distorter.

The equalization response may compensate for frequency response impairment associated with digital-to-analog conversion at the modulator.

The instructions may further include instructions executable by the processor to generate the compensation response based on the equalization response, the sample rate of the pre-distorter, and a second equalization response comprising an equalization response for equalizing an output signal of radio frequency (RF) transmission circuitry of the satellite gateway.

The second equalization response may compensate for frequency response impairment associated with one or both of frequency up-conversion at the RF transmission circuitry and amplification at the RF transmission circuitry.

The RF transmission circuitry may generate a plurality of output signals comprising a respective output signal for each of a plurality of carriers, and the instructions may further include instructions executable by the processor to identify a plurality of equalization responses including a respective equalization response for equalizing each one of the plurality of output signals, and generate the compensation response based on the first equalization response, the sample rate of the pre-distorter, and the plurality of equalization responses, where the plurality of equalization responses includes the second equalization response.

The instructions may further include instructions executable by the processor to generate the compensation response based on the equalization response, the sample rate of the pre-distorter, and a third equalization response comprising an equalization response for equalizing an output signal of a satellite transponder, where the output signal of the satellite transponder includes data transmitted by the satellite gateway.

The third equalization response may compensate for frequency response impairment associated with one or both of amplitude variation at the satellite transponder and group delay variation at the satellite transponder.

The instructions may further include instructions executable by the processor to generate the compensation response based on the equalization response, the sample rate of the pre-distorter, and a fourth equalization response comprising an equalization response for equalizing an input signal of a terminal, wherein the input signal of the terminal includes data transmitted by the satellite gateway.

The fourth equalization response may compensate for frequency response impairment associated with one or both of power fluctuation in a downlink channel from a satellite to the terminal and power fluctuation in an uplink channel from the satellite gateway to the satellite.

The modulator may be one of multiple modulators used for a multi-carrier data transmission of the satellite gateway, and each one of the multiple modulators may generate a respective transmit signal for one or more of a plurality of carriers used for the multi-carrier transmission.

Further disclosed herein is a method comprising identifying, by a processor, an equalization response for equalizing an output signal of a modulator of a satellite gateway, generating a compensation response based on the equalization response and a sample rate of a pre-distorter of the modulator, and sending the equalization response to the pre-distorter.

The equalization response may compensate for frequency response impairment associated with digital-to-analog conversion at the modulator.

The method may further include generating the compensation response based on the equalization response, the sample rate of the pre-distorter, and a second equalization response comprising an equalization response for equalizing an output signal of radio frequency (RF) transmission circuitry of the satellite gateway.

The second equalization response may compensate for frequency response impairment associated with one or both of frequency up-conversion at the RF transmission circuitry and amplification at the RF transmission circuitry.

The RF transmission circuitry may generate a plurality of output signals comprising a respective output signal for each of a plurality of carriers, and the method may further include identifying a plurality of equalization responses including a respective equalization response for equalizing each one of the plurality of output signals, and generating the compensation response based on the first equalization response, the sample rate of the pre-distorter, and the plurality of equalization responses, where the plurality of equalization responses includes the second equalization response.

The method may further include generating the compensation response based on the equalization response, the sample rate of the pre-distorter, and a third equalization response comprising an equalization response for equalizing an output signal of a satellite transponder, where the output signal of the satellite transponder includes data transmitted by the satellite gateway.

The third equalization response may compensate for frequency response impairment associated with one or both of amplitude variation at the satellite transponder and group delay variation at the satellite transponder.

The method may further include generating the compensation response based on the equalization response, the sample rate of the pre-distorter, and a fourth equalization response comprising an equalization response for equalizing an input signal of a terminal, wherein the input signal of the terminal includes data transmitted by the satellite gateway.

The fourth equalization response may compensate for frequency response impairment associated with one or both of power fluctuation in a downlink channel from a satellite to the terminal and power fluctuation in an uplink channel from the satellite gateway to the satellite.

The modulator may be one of multiple modulators used for a multi-carrier data transmission of the satellite gateway, and each one of the multiple modulators may generate a respective transmit signal for one or more of a plurality of carriers used for the multi-carrier transmission.

FIG. 1 illustrates an example of a satellite network 100. Satellite network 100 includes a satellite gateway 102, which can use a radio frequency (RF) antenna 103 to transmit uplink signals to a satellite 105, via an uplink 104. Satellite 105 can receive such uplink signals via uplink 104, and can transmit downlink signals to devices in a coverage area 107 of satellite 105, via a downlink 106. A terminal 109 in coverage area 107 can use an RF antenna 108 to receive downlink signals from satellite 105, via a downlink 106.

Figure 2:
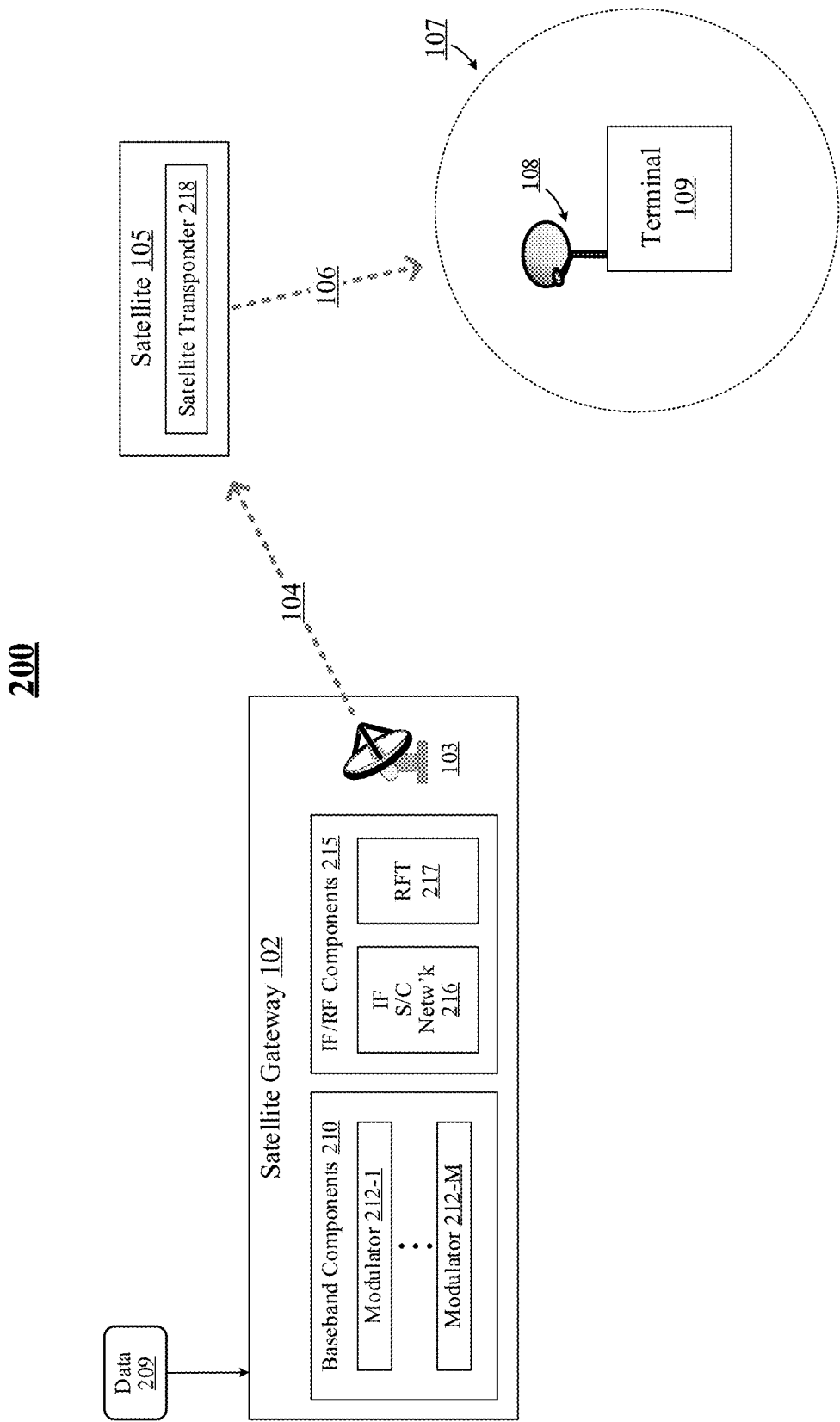
FIG. 2 illustrates an example of a first operating environment.

FIG. 2 illustrates an example of an operating environment 200. As shown in FIG. 2, satellite gateway 102 can include baseband components 210 and intermediate frequency (IF)/RF components 215. Baseband components 210 can include one or more modulators 212-1 to 212-M, where M is a positive integer. IF/RF components 215 can include RF transmitter (RFT) 217.

In operating environment 200, satellite gateway 102 receives data 209 that is to be transmitted to device(s) in coverage area 107 via uplink 104, satellite 105, and downlink 106. Data 209 can be input to one or more of modulators 212-1 to 212-M, each of which can output a modulated IF carrier signal conveying some or all of data 209. RFT 217 can perform frequency upconversion on such IF signals to obtain RF signals, amplify the RF signals, and feed them to RF antenna 103 for transmission over uplink 104. As employed herein, the term "frequency upconversion" denotes the conversion of a band of signal or carrier frequencies from a lower to a higher frequency.

In some implementations, the IF output of each of modulators 212-1 to 212-M can be statically mapped for upconversion to a different respective RF carrier band. In other implementations, IF/RF components 215 can include components providing flexibility with respect to the mapping of modulator outputs to RF carrier bands. For example, as shown in FIG. 2, in some implementations, an IF switching/combining network 216 can be included among IF/RF components 215. In some such implementations, IF switching/combining network 216 may be able to dynamically modify the mapping of modulator outputs to RF carrier bands. For example, IF switching/combining network 216 may be able to switch the mapping of the output of modulator 212-1 from a given RF carrier band to a different RF carrier band. According to some implementations, IF switching/combining network 216 may be able to combine the outputs of multiple modulators and map them to a same RF carrier band. For example, IF switching/combining network 216 may be able to combine the outputs of modulator 212-1 and a second modulator, and map them to a same RF carrier band.

As shown in FIG. 2, satellite 105 can include a satellite transponder 218. Satellite transponder 218 is generally operative to receive, via uplink 104, the RF carrier signals containing data 209, convert/translate them to RF carrier signals of the appropriate frequencies for downlink transmission, and transmit the translated RF carrier signals over downlink 106. In this context, satellite transponder 218 can filter and amplify the received RF carrier signals prior to translation to the appropriate downlink frequencies. Satellite transponder 218 can also filter and amplify the translated RF carrier signals prior to transmitting them over downlink 106.

Figure 3:
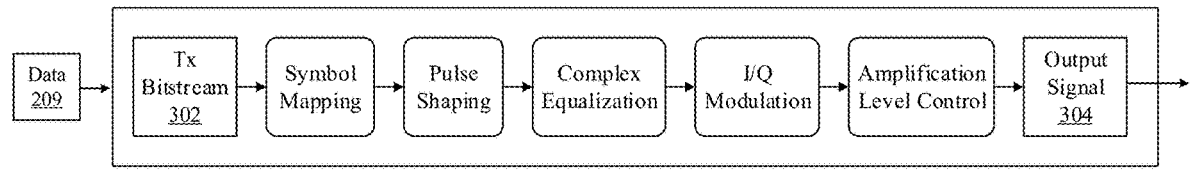
FIG. 3 illustrates an example of a modulator.

FIG. 3 illustrates an example of a modulator 300. Modulator 300 can be representative of any of modulators 212-1 to 212-M of FIG. 2. Modulator 300 can receive some or all of data 209, and can form a transmit (Tx) bitstream 302 from the received portion of data 209. Modulator 300 can perform various signal processing operations upon transmit bitstream 302 in order to generate an output signal 304 comprising the receiver portion of data 209. As shown in FIG. 3, signal processing operations that modulator 300 may perform in order to generate output signal 304 include symbol mapping, pulse shaping (such as root-raised-cosine (RRC) filtering), complex equalization, in-phase/quadrature (I/Q) modulation, and amplification level control. In some implementations, modulator 300 can perform signal processing operations that include upconversion to a frequency of output signal 304. In some implementations, output signal 304 may be an intermediate frequency (IF) signal. In some other implementations, output signal 304 may be an RF signal.

Figure 4:
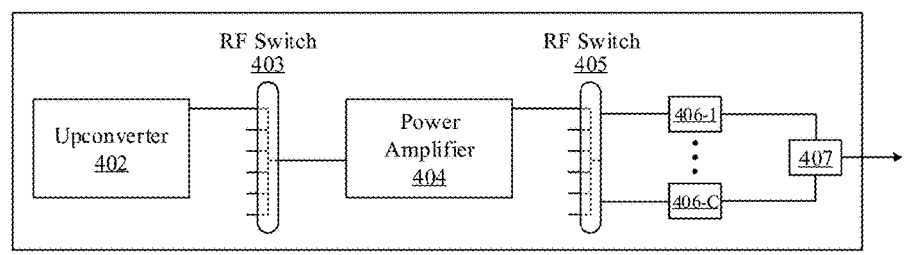
FIG. 4 illustrates an example of a radio frequency transmitter.

FIG. 4 illustrates an example of an RF transmitter (RFT) 400. RFT 400 can be representative of RFT 217 of FIG. 2. As shown in FIG. 4, RFT 400 can include an upconverter 402, an RF switch 403, a power amplifier 404, an RF switch 405, one or more coupler 406-1 to 406-C (where C is a positive integer), and antenna feed 407.

According to some implementations, upconverter 402 may be a multi-band upconverter that accepts multiple IF or RF carrier input signals for upconversion into RF carrier signals of a higher frequency. In some such implementations, IF/RF components 215 of FIG. 2 may include IF switching/combining network 216, and upconverter 402 may receive multiple carrier input signals that are output by IF switching/combining network 216. In other implementations, IF switching/combining network 216 may be omitted from IF/RF components 215, and the multiple carrier input signals that upconverter 402 receives may be respective outputs of multiple modulators among modulators 212-1 to 212-M.

According to some implementations, upconverter 402 may be a single-band upconverter that accepts a single IF or RF carrier input signal for upconversion into an RF carrier signal of a higher frequency. In some such implementations, IF/RF components 215 of FIG. 2 may include IF switching/combining network 216, and upconverter 402 may receive an IF carrier input signal that is output by IF switching/combining network 216. In other implementations, IF switching/combining network 216 may be omitted from IF/RF components 215, and the IF carrier input signal that upconverter 402 receives may be an output of one of modulators 212-1 to 212-M.

In some implementations, upconverter 402 may be one of a plurality of upconverters included in RFT 400. For example, in some implementations, RFT 400 may feature a plurality of single-band upconverters, including upconverter 402, and each of the plurality of single-band upconverters may accept an IF or RF carrier input signal comprising a respective one of a plurality of outputs of IF switching/combining network 216 (if present among IF/RF components 215), or an output of a respective one of modulators 212-1 to 212-M. In some implementations, RFT may feature a plurality of multi-band upconverters, including upconverter 402. In implementations in which RFT 400 includes a plurality of upconverters, the outputs of those upconverters can be passed to RF switch 403. RF switch 403 can enable selection from among those upconverter outputs of RF carrier signals to be passed to power amplifier 404.

Power amplifier 404 can amplify RF carrier input signals to a power level appropriate for transmission over uplink 104. In some implementations, power amplifier 404 may be one of a plurality of power amplifiers included in RFT 400. In such implementations, the outputs of those power amplifiers can be passed to RF switch 405, which can enable selection from among those amplifier outputs of amplified RF carrier signals to be fed to an RF antenna (such as RF antenna 103) for transmission over uplink 104. Amplified RF carrier signals output by RF switch 405 pass to antenna feed 407 via couplers 406-1 to 406-C, and from antenna feed 407 to the RF antenna used for transmission.

Figure 5:
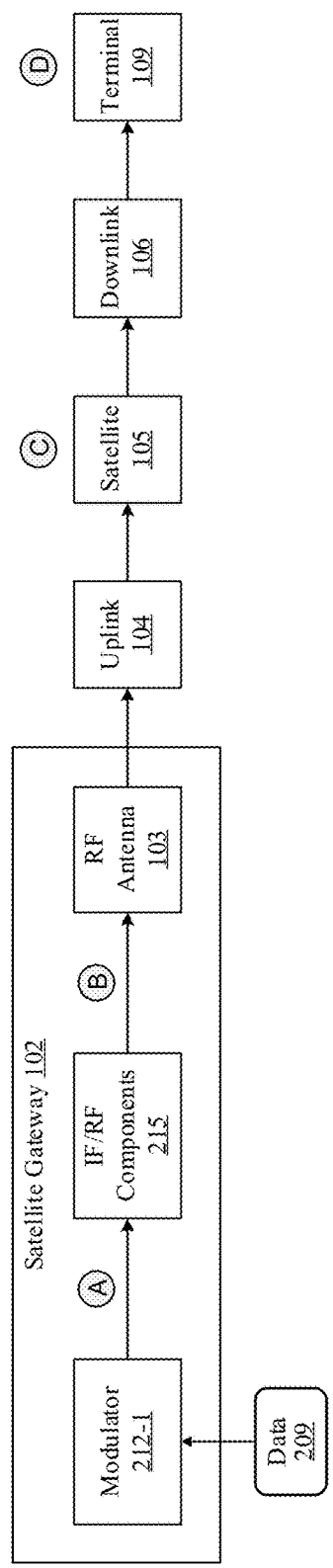
FIG. 5 illustrates an example of a second operating environment.

FIG. 5 illustrates an example of an operating environment 500. In operating environment 500, data 209 is transmitted along a transmit path from satellite gateway 102 to terminal 109. The transmit path depicted in FIG. 5 includes modulator 212-1, IF/RF components 215, RF antenna 103, uplink 104, satellite 105, downlink 106, and terminal 109.

As signaling used to convey data 209 traverses the transmit path in operating environment 500, various signal processing operations can subject it to various types of impairment. As employed herein in reference to a signal, the term "impairment" generally denotes a deviation, with respect to one or more characteristics of the signal, from corresponding characteristics of an ideal signal. Signal impairments observed in operating environment 500 can include, without limitation, gain variation, amplitude variation/ripple/slope (i.e., non-flat amplitude response vs. frequency), group delay variation (i.e., non-linear phase response vs. frequency), non-linearity leading to inter-modulation error, and thermal noise.

Signal processing operations of modulator 212-1 can introduce signal impairments observable at point A. Such impairments can result from imperfections associated with any or all of digital-to-analog conversion, analog filtering, upconversion, and amplification within modulator 212-1. Signal processing operations of IF/RF components 215 can introduce signal impairments observable at point B. Such impairments can be introduced in conjunction with upconversion and/or amplification (such as in RFT 217 of FIG. 2). Such impairments can also be caused by passage of signals through an IF switching/combining network (such as IF switching/combining network 216 of FIG. 2) and/or through inter-facility links (IFLs) such as coaxial cables, optical fibers, or waveguides. Signal processing operations of satellite 105 (such as operations performed by satellite transponder 218 of FIG. 2) can introduce signal impairments observable at point C. Such impairments can result from operations such as filtering, frequency translation, and amplification that are performed at satellite 105. Signal impairments can also be caused by non-ideal characteristics, such as non-ideal frequency response characteristics, of antenna 103, uplink 104, and/or downlink 106. Such impairments can be observable at point D.

Disclosed herein are dynamic transmission impairment correction techniques that can mitigate various signal impairment effects such as those discussed in reference to operating environment 500, and thereby increase the capacity of the satellite link. According to such techniques, carriers in RF transmit signals can be sampled, measured, and analyzed in order to assess impairments affecting those signals. Equalization responses for counteracting such impairments can be identified, and can be used to determine corrections to be applied via pre-compensation in the digital domain. The mitigative effects of this pre-compensation can reduce modulation error and improve signal fidelity.

Figure 6:
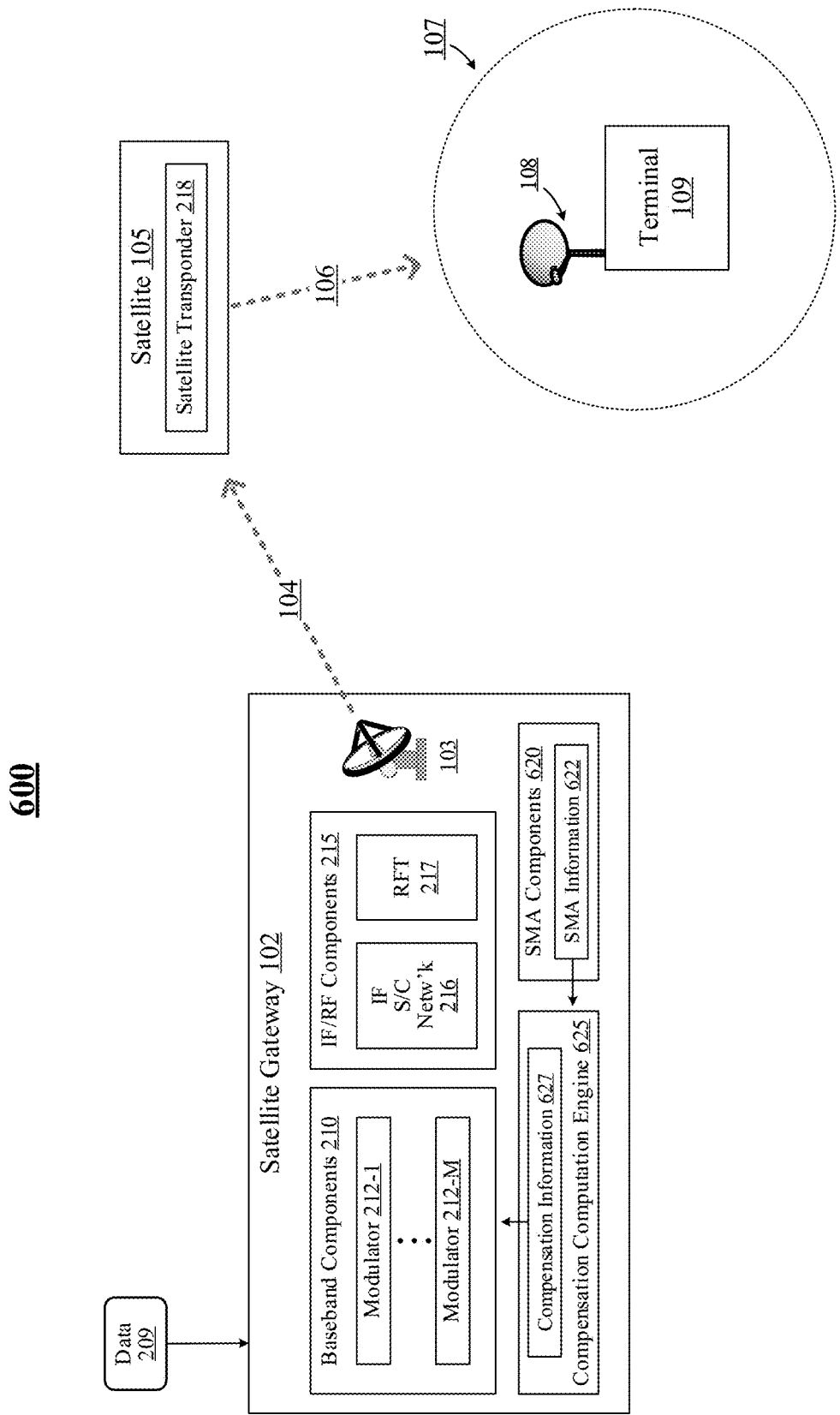
FIG. 6 illustrates an example of a third operating environment.

FIG. 6 illustrates an example of an operating environment 600. In operating environment 600, satellite gateway 102 features signal measurement and analysis (SMA) components 620 and a compensation computation engine 625. SMA components 620 generally comprise a set of components configured to process received carrier signals, determine equalization responses and power level errors for those signals relative to ideal reference signals, and provide compensation computation engine 625 with SMA information 622 describing such equalization responses and power level errors. It is worthy of note that although SMA components 620 are depicted as being internal to satellite gateway 102 in FIG. 6, SMA components 620 may include components that are external to satellite gateway 102. For example, SMA components 620 may include components located at terminals in coverage area 107, such as terminal 109.

Compensation computation engine 625 generally comprises logic, some or all of which may be implemented in hardware, for analyzing received SMA information 622 to determine appropriate compensation responses and power level adjustments to be applied in the digital domain by modulators 212-1 to 212-M. Compensation computation engine 625 passes such compensation responses and power level adjustments to modulators 212-1 to 212-M as compensation information 627, to cause modulators 212-1 to 212-M to apply signal pre-distortions and power level adjustments accordingly. Compensation computation engine 625 can determine such compensation responses based on equalization responses comprised in SMA information 622. In determining a compensation response for a given one of modulators 212-1 to 212-M, compensation computation engine 625 may convert one or more equalization responses comprised in SMA information 622 to a sample rate used by a pre-distorter in that modulator, and determine the compensation response based on the resampled equalization responses.

Figure 7:
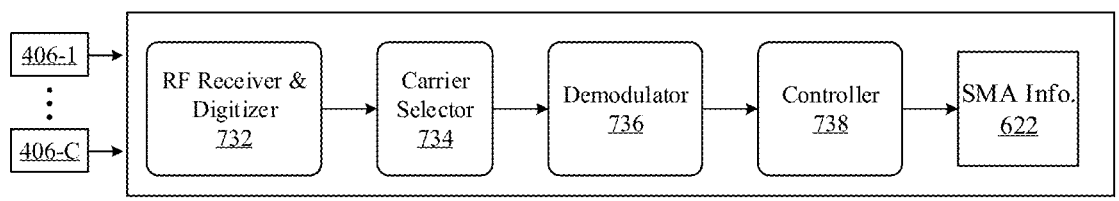
FIG. 7 illustrates an example of a signal measurement and analysis component.

FIG. 7 illustrates an example of signal measurement and analysis (SMA) components 700. SMA components can be representative of some or all of SMA components 620 of FIG. 6. As shown in FIG. 7, SMA components 700 can include RF receiver and digitizer 732, carrier selector 734, demodulator 736, and controller 738. RF receiver and digitizer 732 can receive and digitize analog carrier signals. In some implementations, RF receiver and digitizer 732 can include an ultra-wideband high speed digitizer or analog-to-digital converter (ADC). Carrier selector 734 can select carriers for processing, de-embed coupling factors that may be imparted on some such signals (such as signals received via couplers 406-1 to 406-C), and perform carrier power measurements. Demodulator 736 can demodulate carriers, generate equalization responses (such as in the form of equalization coefficients), and/or generate carrier amplitude and phase/group delay information. Controller 738 can distribute equalization responses/coefficients and power level errors as SMA information 622.

Figure 8:
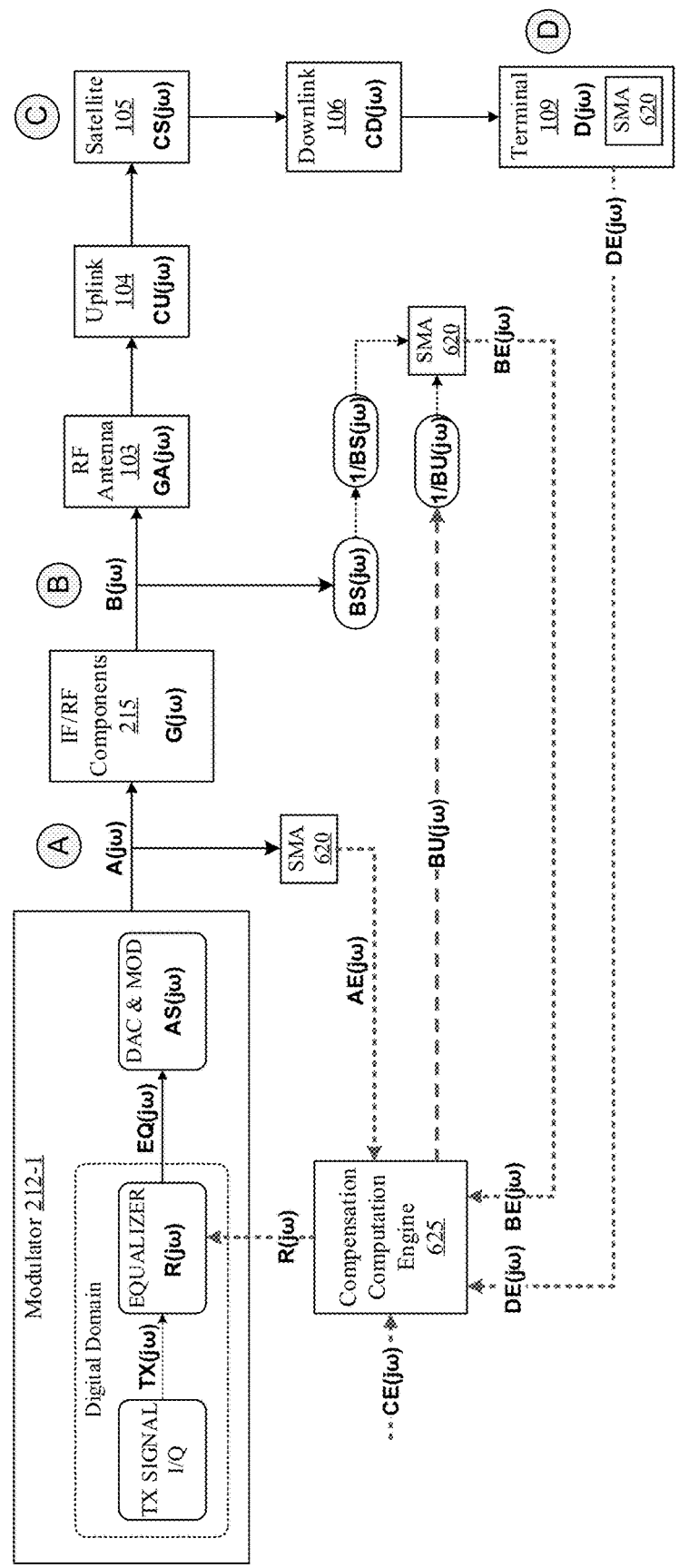
FIG. 8 illustrates an example of a transmission impairment correction scheme.

FIG. 8 illustrates an example of a transmission impairment correction scheme 800. According to transmission impairment correction scheme 800, signal impairments introduced by/associated with various elements along the transmit path of operating environment 500 of FIG. 5 can be corrected.

As shown in FIG. 8, a digital transmit signal with frequency response of $TX(j\omega)$ is generated in the digital domain in modulator 212-1. This signal is then processed through a digital pre-distorter (e.g., complex I/Q equalizer). The pre-distorter applies a compensation response $R(j\omega)$ to the digital transmit signal $TX(j\omega)$, resulting in a signal $EQ(j\omega)$ that passes to the DAC and modulator IF/RF hardware. At startup, the pre-distorter has an impulse response with unity gain. Thus, the digital transmit signal passes through it unmodified, corresponding to a response $R(j\omega)=1$. The signal $EQ(j\omega)$ is processed by the DAC and modulator IF/RF hardware, which outputs a signal $A(j\omega)$.

SMA 620 calculates the error in the signal at point A (compared to an expected ideal reference signal) created due to impairment response $AS(j\omega)$ of the DAC and modulator IF/RF hardware. SMA 620 then generates the response $AS^{-1}(j\omega)$ needed to equalize or compensate this signal, and forwards this equalization response as $AE(j\omega)$ to compensation computation engine 625. Compensation computation engine 625 then converts this $AE(j\omega)$ to the sample rate used by the digital pre-distorter in the modulator 212-1. It forwards this resulting compensation response $R(j\omega)$ to the modulator pre-distorter module. The pre-distorter then applies this response $R(j\omega)$ to pre-compensate the signal $TX(j\omega)$. This will improve the SNR at point A. This process of using $AE(j\omega)$ to generate $R(j\omega)$ is a feedback loop and error indicated by $AE(j\omega)$ decreases as time progresses. At any time 't', compensation computation engine 625 remembers the cumulative historic response $RH(j\omega)$ based on all the previously received $AE(j\omega)$. Since $AE(j\omega)$ is just an error compared to the expected, the additional compensation required to handle the new $AE(j\omega)$ received at time 't' is combined with the current $RH(j\omega)$. The effective $R(j\omega)$ to pre-compensate the signal $TX(j\omega)$ is then determined as the product of the cumulative historic response $RH(j\omega)$ and the resampled version of the new $AE(j\omega)$.

Pre-compensation can be extended to also correct impairments present in the signal at point B. When the error at A, indicated by $AE(j\omega)$, goes below a pre-defined threshold after applying pre-compensation, it can be ignored by compensation computation engine 625. SMA 620 can then calculate (relative to an expected ideal reference signal) the error in the signal at point B created due to an impairment response $G(j\omega)$ of the IF/RF components 215. The signal $B(j\omega)$ sampled for that purpose is the same as that fed to the antenna 103. The impairment response $G(j\omega)$ is the product of the gain a of IF/RF components 215 and a normalized error response $g(j\omega)$. The gain a of IF/RF components 215 may not necessarily be equal to a desired gain k designed to achieve a target carrier power level.

The signal $B(j\omega)$ sampled at point B may also reflect an impairment response $BS(j\omega)$ caused by cabling included in the transmit path through IF/RF components 215. Thus, the signal $B(j\omega)$ may first be compensated with a response $BS^{-1}(j\omega)$, and then fed to SMA 620.

In order to apply gain compensation when the gain a differs from the desired gain k, SMA 620 can generate a response $G^{-1}(j\omega)$ according to Equation 1 as follows:

$$G^{-1}(j\omega)=(k/a)\cdot g^{-1}(j\omega) \tag{1}$$

where $g^{-1}(j\omega)$ represents the inverse of the normalized error response $g(j\omega)$. SMA 620 can generate an equalization response $BE(j\omega)$ for counteracting impairment present in the signal at point B according to Equation 2 as follows:

$$BE(j\omega)=G^{-1}(j\omega)\cdot BU^{-1}(j\omega) \tag{2}$$

where $BU^{-1}(j\omega)$ represents the inverse of a forward compensation response $BU(j\omega)$ determined by compensation computation engine 625 and provided to SMA 620. At startup, $BU(j\omega)$ is an impulse response with unity gain, such that $BU(j\omega)=1$. SMA 620 forwards equalization response $BE(j\omega)$ to the compensation computation engine 625, which converts it to the sample rate used by the digital pre-distorter in the modulator 212-1. It then combines this resampled $BE(j\omega)$ with the current cumulative historic response $RH(j\omega)$ to get the new required response $R(j\omega)$. Compensation computation engine 625 forwards this resulting compensation response $R(j\omega)$ to the pre-distorter module of modulator 212-1, which applies this response $R(j\omega)$ to pre-compensate the signal $TX(j\omega)$, improving the SNR at point B.

Pre-compensation can further be extended to also correct impairments present in the signal at point C. When the error in the signal at point B, as indicated by $BE(j\omega)$, drops below a pre-defined threshold, compensation computation engine 625 may initiate compensation for impairment present in the signal at point C. For this purpose, compensation computation engine 625 can identify an equalization response $CE(j\omega)$ that is the inverse $CS^{-1}(j\omega)$ of a static frequency response $CS(j\omega)$ of satellite 105. The static frequency response $CS(j\omega)$ of satellite 105 can be pre-calibrated at the time of manufacture. Compensation computation engine 625 converts equalization response $CE(j\omega)$ to the sample rate used by the digital pre-distorter in the modulator 212-1, and combines this resampled $CE(j\omega)$ with the current cumulative historic response $RH(j\omega)$ to get the new required response $R(j\omega)$. Compensation computation engine 625 forwards this resulting compensation response $R(j\omega)$ to the pre-distorter module of modulator 212-1, which applies this response $R(j\omega)$ to pre-compensate the signal $TX(j\omega)$, improving the SNR at point C.

Pre-compensation can be further extended to also correct impairments present in the signal at point D. SMA 620 can calculate (relative to an expected ideal reference signal) the error in the signal at point D created due to an impairment response $GA(j\omega)$ of antenna 103, an impairment response $CU(j\omega)$ of uplink 104 and an impairment response $CD(j\omega)$ of downlink 106. The signal $D(j\omega)$ at point D can be sampled by one or more terminals such as terminal 109, any one of which can be a user terminal or a custom monitor terminal.

SMA 620 can generate an equalization response $DE(j\omega)$ for counteracting impairment present in the signal at point D according to Equation 3 as follows:

$$DE(j\omega)=)GA^{-1}(j\omega)\cdot CU^{-1}(j\omega)\cdot CD^{-1}(j\omega) \tag{3}$$

SMA 620 then forwards equalization response $DE(j\omega)$ to the compensation computation engine 625, which converts it to the sample rate used by the digital pre-distorter in the modulator 212-1.

Compensation computation engine 625 combines this resampled $DE(j\omega)$ with the current cumulative historic response $RH(j\omega)$ to get the new required response $R(j\omega)$. Compensation computation engine 625 then forwards this resulting compensation response $R(j\omega)$ to the pre-distorter module of modulator 212-1, which applies this response R(jω) to pre-compensate the signal TX(jω), improving the SNR at point D.

Compensation computation engine 625 can keep track of the effective historical contribution to compensation response RH(jω) on the part of equalization responses CE(jω) and DE(jω). Compensation computation engine 625 provides SMA 620 with equalization response BU(jω) in order to inform SMA 620 of this effective historical contribution. In so doing, compensation computation engine 625 can prevent a race condition between the equalization responses BE(jω), CE(jω), and DE(jω).

It is worthy of note that in some implementations, according to transmission impairment correction scheme 800, different respective compensation responses can be generated for each of multiple transmit paths, each of which can correspond to a respective one of multiple modulators. For example, in the context of operating environment 600 of FIG. 6, in which baseband components 210 include modulators 212-1 to 212-M, implementation of transmission impairment correction scheme 800 may involve generating compensation responses $R_1(j\omega)$ to $R_M(j\omega)$, each of which is forwarded to the pre-distorter module of its respective modulator among modulators 212-1 to 212-M.

It is also worthy of note that in some implementations, multiple carriers can be used for data transmissions subject to transmission impairment correction scheme 800, such that IF/RF components 215 output multiple carrier signals, each of a different respective carrier frequency. In such multi-carrier implementations, error responses $BE_1(j\omega)$ to $BE_N(j\omega)$ can be determined that represent the error responses for the multiple carriers at point B, where N is a positive integer representing the number of carriers. Compensation computation engine 625 can then combine these error responses to generate the overall BE(jω) for the entire frequency band, according to Equation 4 as follows:

$$BE(j\omega) = \sum_{n=1}^{N} BEn(j\omega) \qquad (4)$$

Likewise, error responses $DE_1(j\omega)$ to $DE_N(j\omega)$ can be determined that represent the error responses for the multiple carriers at point D. Compensation computation engine 625 can then combine these error responses to generate the overall DE(jω) for the entire frequency band, according to Equation 5 as follows:

$$DE(j\omega) = \sum_{n=1}^{N} DEn(j\omega) \qquad (5)$$

According to some embodiments, transmission impairment correction scheme 800 may be implemented simply to compensate for signal impairments introduced by modulator 212-1. In such cases, SMA 620 may measure output levels and amplitude and phase responses at point A, and compensation computation engine 625 may use this information to determine gain correction values and generate compensation responses to counteract the impairments introduced by modulator 212-1. In some implementations, this process may be dynamic, such that SMA 620 performs measurements on an ongoing basis, and compensation computation engine 625 dynamically determines gain correction values and generates compensation responses on an ongoing basis. In other implementations, this process may be static, such that it is conducted at the time of rollout of modulator 212-1 but not necessarily repeated thereafter.

In some implementations, transmission impairment correction scheme 800 may be implemented to compensate for signal impairments observable at points A and B. In some such implementations, compensation responses may first be determined and applied for signal impairments observable at point A. Additional compensation responses may then be determined and applied for signal impairments observable at point B. In other implementations, such as cases in which modulator impairment compensation data at point A is not available, compensation responses may be determined simply for signal impairments observable at point B.

Figure 9:
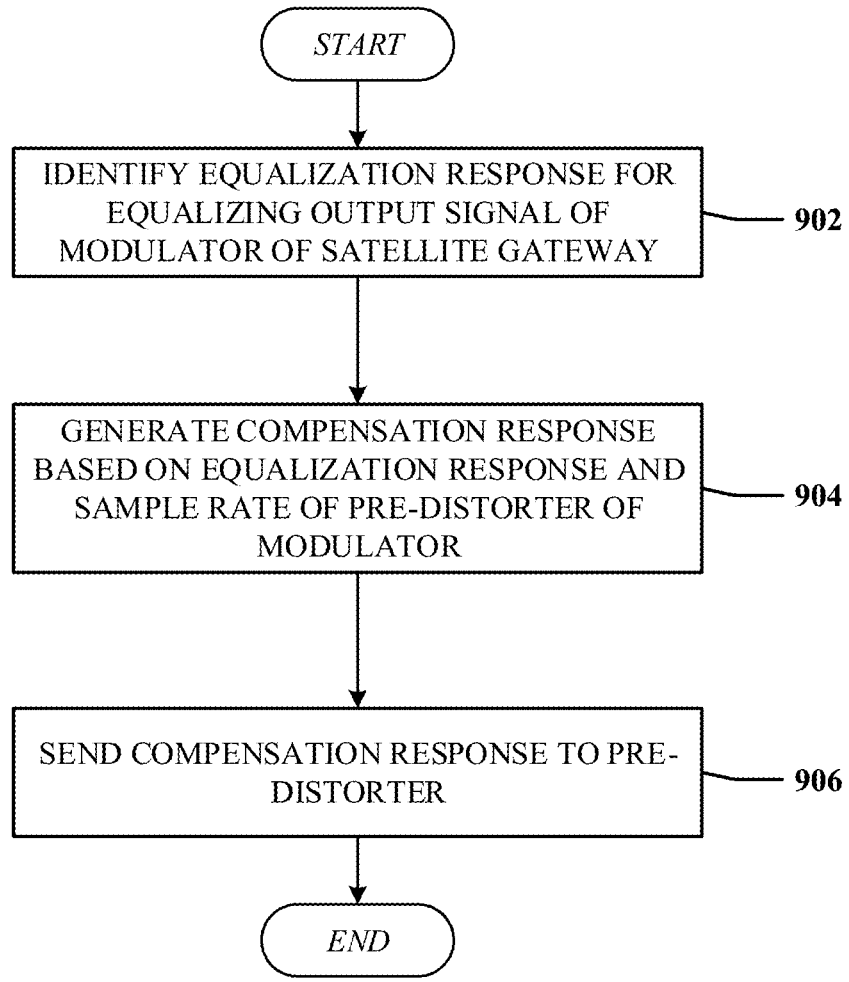
FIG. 9 illustrates an example of a process flow.

FIG. 9 illustrates an example of a process flow 900. Process flow 900 can be representative of operations performed by compensation computation engine 625 of FIG. 6. As shown in FIG. 9, an equalization response for equalizing an output signal of a modulator of a satellite gateway may be identified at 902. For example, in operating environment 600 of FIG. 6, compensation computation engine 625 may identify, based on SMA information 622, an equalization response for equalizing an output signal of modulator 212-1. At 904, a compensation response may be generated based on the equalization response and a sample rate of a pre-distorter of the modulator. For example, in operating environment 600 of FIG. 6, compensation computation engine 625 may generate a compensation response based on the equalization response identified at 902 and a sample rate of modulator 212-1. At 906, the compensation response may be send to the pre-distorter of the modulator. For example, in operating environment 600 of FIG. 6, compensation computation engine 625 may send compensation information 627 to the pre-distorter of modulator 212-1, and compensation information 627 may comprise the compensation response identified at 904.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer-readable media associated therewith (e.g., disks, memories, etc.). A computer program product may comprise such instructions stored on computer-readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system, comprising:
a processor; and
a memory coupled to the processor, the memory storing instructions executable by the processor to:
identify a first equalization response for a transmit path for data transmissions of a satellite gateway, wherein the first equalization response compensates for one or both of:
signal impairment associated with a modulator in the transmit path; and
signal impairment associated with radio frequency (RF) transmission circuitry in the transmit path;
generate a compensation response based on:
the first equalization response;
a second equalization response, wherein the second equalization response compensates for signal impairment associated with a transponder in the transmit path; and
a sample rate of a pre-distorter of the modulator; and
send the compensation response to the pre-distorter.

2. The system of claim 1, wherein the first equalization response compensates for signal impairment associated with one or more of:
digital-to-analog conversion at the modulator;
analog filtering at the modulator;
frequency upconversion at the modulator; and
amplification at the modulator.

3. The system of claim 1, wherein the first equalization response compensates for signal impairment associated with one or both of:
frequency upconversion at the RF transmission circuitry; and
amplification at the RF transmission circuitry.

4. The system of claim 1, wherein the first equalization response compensates for signal impairments including one or more of:

amplitude response variation with frequency;
non-linearity of phase response variation with frequency; and
gain variation with frequency.

5. The system of claim 1, wherein the satellite gateway includes a plurality of modulators, wherein the memory stores instructions executable by the processor to generate a respective compensation response for each one of the plurality of modulators.

6. The system of claim 1, wherein the transponder is a satellite transponder.

7. The system of claim 1, wherein the second equalization response compensates for signal impairment associated with one or more of:
analog filtering at the satellite transponder;
frequency translation at the satellite transponder; and
amplification at the satellite transponder.

8. The system of claim 1, wherein the second equalization response compensates for signal impairment associated with one or more of:
amplitude response variation with frequency;
non-linearity of phase response variation with frequency; and
gain variation with frequency.

9. The system of claim 1, wherein the memory stores instructions executable by the processor to generate the compensation response based on:
the first equalization response;
the second equalization response;
the sample rate of the pre-distorter; and
a third equalization response, wherein the third equalization response compensates for signal impairment associated with one or more of:
an RF antenna in the transmit path;
an uplink from the satellite gateway to a satellite in the transmit path; and
a downlink from the satellite to a terminal in the transmit path.

10. The system of claim 9, wherein the third equalization response compensates for signal impairment associated with one or both of:
power fluctuation in the uplink; and
power fluctuation in the downlink.

11. A method, comprising:
identifying, by a processor, a first equalization response, for a transmit path for data transmissions of a satellite gateway, wherein the first equalization response compensates for one or both of:
signal impairment associated with a modulator in the transmit path; and
signal impairment associated with radio frequency (RF) transmission circuitry in the transmit path;
generating a compensation response based on:
the first equalization response;
a second equalization response, wherein the second equalization response compensates for signal impairment associated with a transponder in the transmit path; and
a sample rate of a pre-distorter of the modulator; and
sending the compensation response to the pre-distorter.

12. The method of claim 11, wherein the first equalization response compensates for signal impairment associated with one or more of:
digital-to-analog conversion at the modulator;
analog filtering at the modulator;
frequency upconversion at the modulator; and
amplification at the modulator.

13. The method of claim 11, wherein the first equalization response compensates for signal impairment associated with one or both of:
frequency upconversion at the RF transmission circuitry; and
amplification at the RF transmission circuitry.

14. The method of claim 11, wherein the first equalization response compensates for signal impairments including one or more of:
amplitude response variation with frequency;
non-linearity of phase response variation with frequency; and
gain variation with frequency.

15. The method of claim 11, comprising generating a respective compensation response for each one of a plurality of modulators of the satellite gateway.

16. The method of claim 11, wherein the transponder is a satellite transponder.

17. The method of claim 11, wherein the second equalization response compensates for signal impairment associated with one or more of:
analog filtering at the satellite transponder;
frequency translation at the satellite transponder; and
amplification at the satellite transponder.

18. The method of claim 11, wherein the second equalization response compensates for signal impairment associated with one or more of:
amplitude response variation with frequency;
non-linearity of phase response variation with frequency; and
gain variation with frequency.

19. The method of claim 18, comprising generating the compensation response based on:
the first equalization response;
the second equalization response;
the sample rate of the pre-distorter; and
a third equalization response, wherein the third equalization response compensates for signal impairment associated with one or more of:
an RF antenna in the transmit path;
an uplink from the satellite gateway to a satellite in the transmit path; and
a downlink from the satellite to a terminal in the transmit path.

20. The method of claim 11, wherein the third equalization response compensates for signal impairment associated with one or both of:
power fluctuation in the uplink; and
power fluctuation in the downlink.

21. A system, comprising:
a processor; and
a memory coupled to the processor, the memory storing instructions executable by the processor to:
identify a first equalization response for a transmit path for data transmissions of a satellite gateway, wherein the first equalization response compensates for one or both of:
signal impairment associated with a modulator in the transmit path; and
signal impairment associated with radio frequency (RF) transmission circuitry in the transmit path;
generate a compensation response based on:
the first equalization response;
a second equalization response, wherein the second equalization response compensates for signal impairment associated with one or more of:

an RF antenna in the transmit path;
an uplink from the satellite gateway to a satellite in the transmit path; and
a downlink from the satellite to a terminal in the transmit path; and
a sample rate of a pre-distorter of the modulator; and
send the compensation response to the pre-distorter.

22. The system of claim 21, wherein the first equalization response compensates for signal impairment associated with one or more of:
digital-to-analog conversion at the modulator;
analog filtering at the modulator;
frequency upconversion at the modulator; and
amplification at the modulator.

23. The system of claim 21, wherein the first equalization response compensates for signal impairment associated with one or both of:
frequency upconversion at the RF transmission circuitry; and
amplification at the RF transmission circuitry.

24. The system of claim 21, wherein the second equalization response compensates for signal impairment associated with one or both of:
power fluctuation in the uplink; and
power fluctuation in the downlink.

25. The system of claim 21, wherein the memory stores instructions executable by the processor to generate the compensation response based on:
the first equalization response;
the second equalization response;
the sample rate of the pre-distorter; and
a third equalization response, wherein the third equalization response compensates for signal impairment associated with a satellite transponder in the transmit path.

* * * * *